United States Patent [19]

Watanabe

[11] 4,441,059
[45] Apr. 3, 1984

[54] CUTTING FEED SENSING DEVICE

[75] Inventor: Mitsuru Watanabe, Takata, Japan

[73] Assignee: Fuji Seiki Machine Works, Ltd., Shizuoka, Japan

[21] Appl. No.: 321,959

[22] Filed: Nov. 16, 1981

[30] Foreign Application Priority Data

Dec. 12, 1980 [JP] Japan .................. 55-177667

[51] Int. Cl.³ ............................................ G05B 19/24
[52] U.S. Cl. .................................... 318/39; 318/571; 318/603; 408/11
[58] Field of Search ................ 408/11; 409/186, 187; 340/680; 318/39, 603, 571

[56] References Cited

U.S. PATENT DOCUMENTS

| 3,906,324 | 9/1975 | Smith | 318/571 X |
| 4,260,986 | 4/1981 | Kobayashi et al. | 340/680 |
| 4,315,200 | 2/1982 | Yamada et al. | 318/571 X |
| 4,330,832 | 5/1982 | Kohzai et al. | 318/571 X |
| 4,379,987 | 4/1983 | Kohzai et al. | 318/571 X |

FOREIGN PATENT DOCUMENTS

52/138787  11/1977  Japan
53/101185   9/1978  Japan

Primary Examiner—B. Dobeck
Attorney, Agent, or Firm—Flynn, Thiel, Boutell & Tanis

[57] ABSTRACT

A feed rate sensing system for a drilling machine or the like in which a linearly movable cutting tool-supporting block carries a rotatable tool spindle. Linear motion of the supporting block is converted to rotation of a screw and an encoder driven by the screw generates feed pulses representing feeding of the tool toward a workpiece. A proximity switch unit monitors rotation of the tool spindle and produces rotation pulses in relation thereto. A counter and latch circuit produces a digital output representing the feed rate of the tool-supporting block per revolution of the tool spindle and this digital output is converted to a voltage level representing the actual feed rate. A circuit compares such actual feed rate voltage with a desired feed rate voltage, the difference therebetween being applied to a meter.

9 Claims, 8 Drawing Figures

CUTTING FEED SENSING DEVICE

FIELD OF THE INVENTION

This invention relates to a cutting rate sensing device for a drilling machine.

BACKGROUND OF THE INVENTION

Numerically controlled (N.C.) machine tools have been developed to an extraordinarily high level of technology and have become quite reliable tools. However, known N.C. machines are not sufficiently equipped for checking out or examination of whether the performance of the machine is properly worked out or not. To the extent that appliances for such checking or examination have been available, they have been complicated in structure and expensive.

The assignee of the present invention once offered one sensing system (here shown in FIGS. 1, 2 and 3) for drilling machines, including a revolving cutting tool 3, a cutting tool supporting block 4, a screw thread spindle 6 and a ball thread appliance A. In that prior sensing system, the feed rate of the cutting tool is represented by the indicator of the meter B, which indicates when the real feed rate is faster or slower, and the feed rate of the tool is controlled by observing movement of the indicator of the meter. The said meter makes a comparison of two physico-electric quantities M1 and M2. The quantity M1 represents real feed rate per unit of time and is an electric potential quantity (voltage) generated in such a way that linear cutting motion of the tool supporting block 4, which drives cutting tools such as drills, taps and other kinds of cutting tools and advances and retracts the tool with respect to the workpiece, is converted to revolving motion of the screw thread spindle 6 by means of the ball-thread appliance A. Said screw spindle 6 drives a generator 8 (FIG. 3), by which an electric potential is generated and is multiplied by a number l representing the lead length of said screw spindle. The other quantity M2, representing adapted (desired or preselected) cutting feed rate per unit time, is a quantity obtained by multiplying a generated electric potential by a number L representing the adapted cutting feed (or a predetermined pitch length per revolution). The latter electric potential is generated by a generator 12 driven by a revolving spindle which revolves at the same rotational speed as the cutting tool spindle 9.

Such equipment uses generators. The frequency of the generated current becomes low and rectification does not occur properly because the cutting feed rate becomes too low. Accordingly, the indicator of the meter does not stabilize.

Also, the electric potential output of generator G1 cannot linearly follow abrupt changes in the feed motion, causing the indicator of the meter to lag behind sudden changes in feed motion. For example, if the feed rate is changed, as from rapid feed to cutting feed, the indicator does not return rapidly because the generator voltage is high in rapid feed. This high voltage must be discharged when the feed is changed to the lower, cutting feed rate, and this discharge requires some time, thus delaying the return of the indicator to its initial point.

Also, if the tool motion stops during cutting, the potentials M1 and M2 each become zero. Thus, if a comparison thereof is made by dividing M1 by M2, the resulting calculation is written 0 volts/0 volts and the location of the indicator of meter B is indeterminate. Such are the defects of the previous device.

An object of this invention is to offer a new cutting feed sensing device for a drilling machine, which avoids the above-mentioned defects of the prior sensing device.

SUMMARY OF THE INVENTION

The objects and purposes of this invention are met by providing a feed rate sensing system for a drilling machine or the like having a cutting tool supporting block linearly movable toward and away from a workpiece and carrying a tool spindle which in turn rotatably supports the tool engageable with the workpiece, the linear motion of the supporting block being converted to rotation of a screw thread spindle. A counting device receives feed pulses generated by rotation of the screw in response to linear motion of the supporting block and also receives rotation pulses generated in response to the rotation of the tool spindle. The counting device in turn produces a digital output at a rate representing the feed rate of the tool-supporting block per revolution of the tool spindle. A digital/analog converter converts such digital output to an analog electrical value which is applied to one input of an electronic device. A circuit using a potentiometer converts the desired feed rate per revolution of the cutting tool to an electrical value which is applied to the other input of the electronic device to produce an output representing the difference between the desired and actual feed rate values, such difference in output being applied to a synchronism meter for display.

Other objects and purposes of the invention will be apparent to persons acquainted with apparatus of this general type upon reading the following specification and inspecting the accompanying drawings.

DETAILED DESCRIPTION

Figure 1:
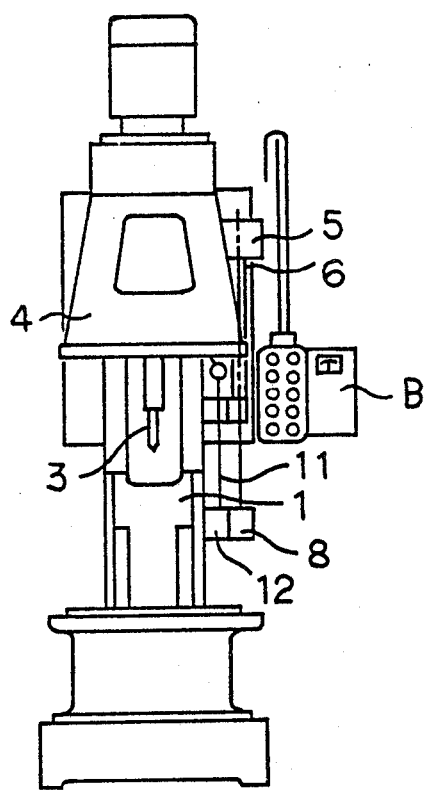
FIG. 1 is a front view of a cutting feed sensing system for drilling machines, which the assignee of the present invention offered previously.
Figure 2:
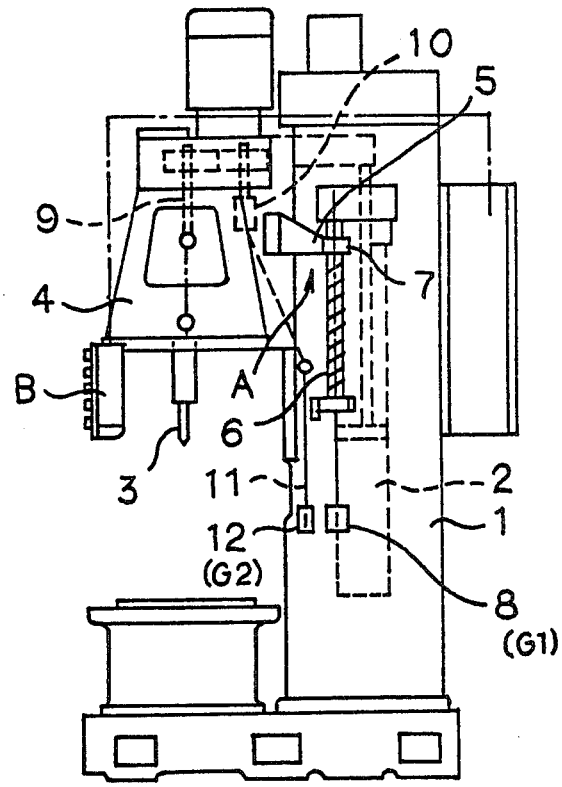
FIG. 2 is a side view of the FIG. 1 system.
Figure 3:
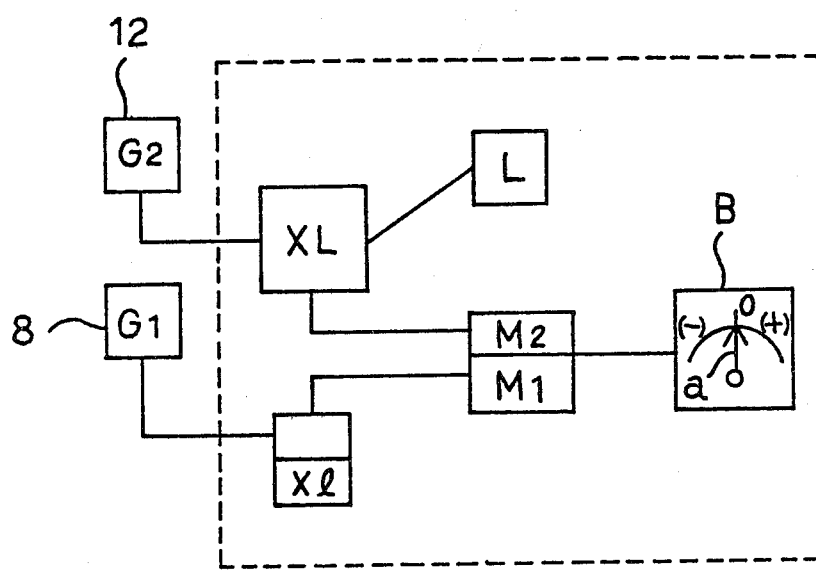
FIG. 3 is a block diagram of the control portion of the FIG. 1 system.
Figure 4:
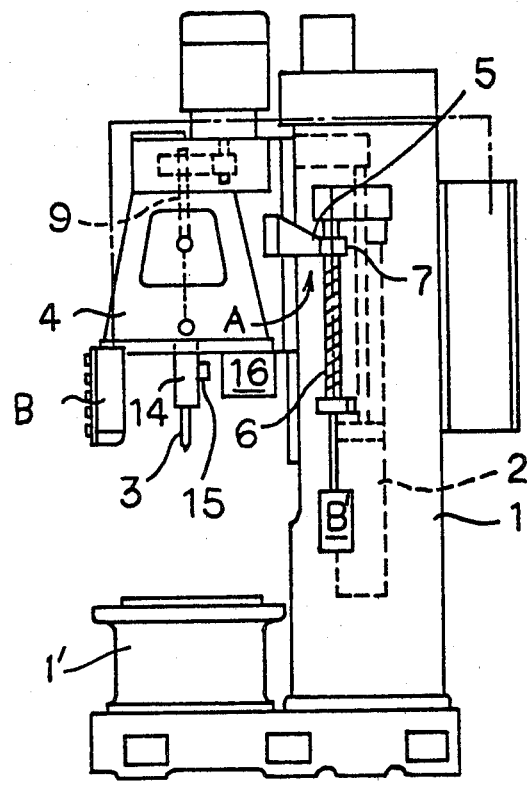
FIG. 4 is a side view of a cutting rate sensing system for drilling machines, embodying the present invention.
Figure 5:
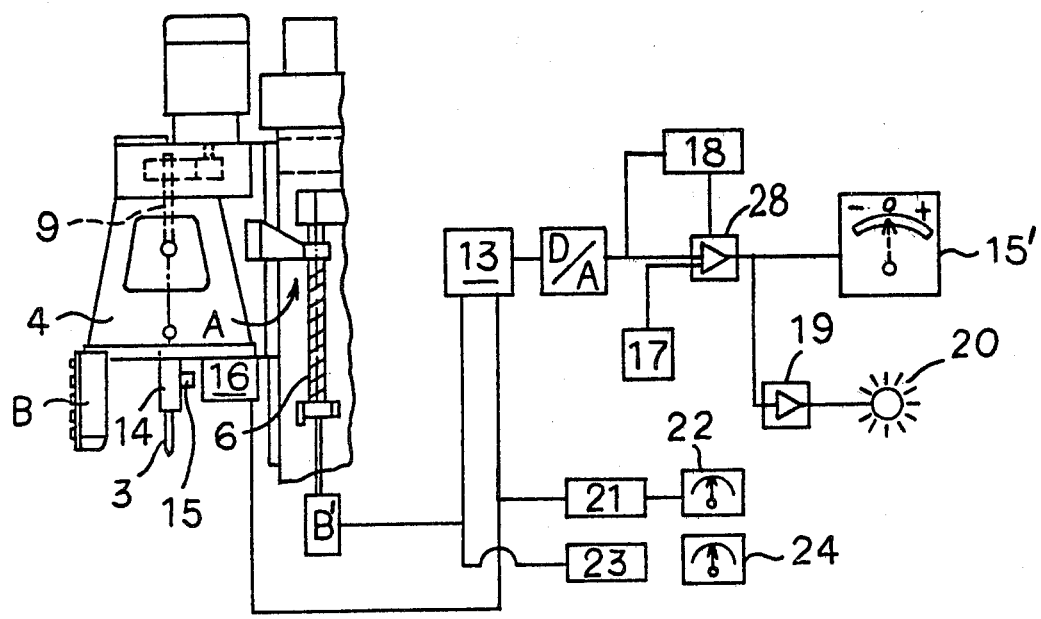
FIG. 5 is a block diagram showing the control portion of the FIG. 4 system.

Attention is directed to the embodiment of the invention shown in FIGS. 4 and 5 in which the invention is, for purposes of illustration, disclosed installed on a conventional drilling machine like that of FIGS. 2 and 3 discussed above. To summarize, such conventional drilling machine includes a machine column 1 upstanding beside a workpiece support 1' on a base. A supporting block 4 is vertically slidably guided on the column 1 above the tool support 1'. The column 1 and support block 4 are connected by a hydraulic cylinder unit, indicated in broken lines at 2, the piston of which is actuable from a conventional pressure supply not shown to lower the support block 4 toward the work support 1' or raise the support block upward away therefrom.

The support block rotatably supports an upstanding tool spindle 9 which has a depending portion 14 for gripping a tool 3 and which further is rotatably driven (as indicated by broken lines in FIG. 4) through a suitable gear train or the like from a motor (as at 10 in FIG. 2).

A conventional ball-screw appliance A includes an upstanding screw spindle 6 mounted for rotation on its upper and lower ends on the column 1. A bracket 5 is fixed at one end thereof to a nut 7 threadedly engaging the screw spindle 6, the other end of the bracket 5 being fixed to the tool supporting block 4, such that downward movement of the block 4 acts through the bracket 5 and nut 7 to rotate the screw spindle 6.

It will be seen that a cutting tool 3 supported by the supporting block 4 is both rotatably driven, and is advanced or retracted by corresponding vertical movement of the supporting block 4 along the machine column 1.

Turning more particularly to the feed rate sensing system embodying the invention, and shown in FIGS. 4 and 5, the vertical, that is to say feed, movement of the supporting block 4 is converted to rotation of the screw spindle 6 by the ball screw appliance A. The ball screw spindle 6 drives a pulse-delivering encoder B' which delivers pulses to a counter 13 at a rate corresponding to the rate of feed movement of the supporting block 4 and tool 3 carried thereby.

Meanwhile, the rotating tool spindle 14, carrying the tool 3, has fixed thereon the actuating section 15 of a proximity switch 16. The proximity switch 16, which is actuated by such actuating section 15 on the spindle, is fixed on the tool support 4, so as to generate a pulse for each revolution of the tool spindle 14, as the magnetic field of the proximity switch 16 is crossed by the actuating section 15 on the spindle 14. Pulses generated by the proximity switch 16 are also directed to the counter 13.

The counter 13, in cooperation with a corresponding latch circuit, as hereafter discussed, calculates as a digital number the feed rate (rate of downward movement) of the spindle supporting block 4 per unit revolution of the tool 3, by dividing the pulse output of encoder B' by revolutions of the tool spindle 14. This digital number, namely the number of pulses per unit revolution of the spindle 14, is converted to a corresponding voltage level by means of a digital/analog converter D/A. Such voltage, or electric potential, is directed to a comparison circuit 28.

On the other hand, the adapted (selected or desired) feed rate of the tool 3 per unit revolution of such tool, is converted to an electric potential by setting of a potentiometer 17 provided with a constant current supply circuit as hereafter discussed. Such electric potential, a preselectable constant quantity, is also directed to the comparison circuit 28. The output of the comparison circuit 28 is indicated on a synchronized meter 15'.

The system of FIG. 5 further includes a circuit 18 for making the output of the comparison device 28 null, or zero, and for causing the synchronizing meter 15' not to work when the voltages representing the desired feed rate and actual feed rate are far different. In addition, a voltage control circuit 19 ignites an indicating lamp 20 whenever the difference in potentials delivered to the comparison circuit 28 exceeds the normal range of the meter 15'. Also, feed rate conversion devices 21 and 23 convert the digital feed rate and tool spindle revolution signals, at the outputs of the proximity switch 16 and encoder B', to corresponding electric potentials, and feed such electric potentials respectively to a feed rate meter 22 and a tool spindle revolution meter 24.

In the above-described embodiment of the invention, the electric potential which corresponds to the desired feed rate of the cutting tool 3 and the electrical potential which corresponds to the actual feed rate of the supporting block per revolution of the cutting tool, are thus fed to the comparison circuit 28, which provides an output signal to drive the synchrometer 15'. In more detail, the electric potential corresponding to the desired feed rate of the particular cutting tool being used, for example the potential corresponding to the lead of a thread made by a tap, or the feed rate per revolution of a drill, is to be provided. After the cutting tool 3 is rotatably driven, the supporting block 4 is advanced downward toward a workpiece on work support 1', by the hydraulic force generated by applying oil under pressure to the hydraulic cylinder 2. The actual feed rate per revolution of the cutting tool 3 (for example if the cutting tool is a tap, the lead of the tap, or if the cutting tool is a drill, the cutting feed rate of the drill) is converted to an electric potential. These two electric potentials, respectively representing actual cutting feed rate and desired cutting feed rate, are applied to the comparator circuit 28 and the output of this comparator circuit is delivered to the synchrometer 15'. The synchrometer 15' indicates 0 when the two feed rates are the same. If not the same, the indicator 15' indicates the divergence of the two feed rates. The human operator controls oil control valves (not shown) to supply oil under pressure to the hydraulic cylinder 2 to try to keep the indicator of the synchrometer 15' always at its 0 position.

When the actual feed rate of the tool toward the workpiece is low, namely below a certain value, such as the pitch of a thread to be cut, the generated electric potential may be reduced to 0 by addition to the circuit of an FET (field effect transistor), as hereafter discussed, so that the indicator of the synchrometer 15' can be held at a fixed position.

By means of the above-discussed improvements, the system embodying the invention provides for sensing of the cutting feed of a drilling machine with greater exactness and sensitivity.

Figure 6A:
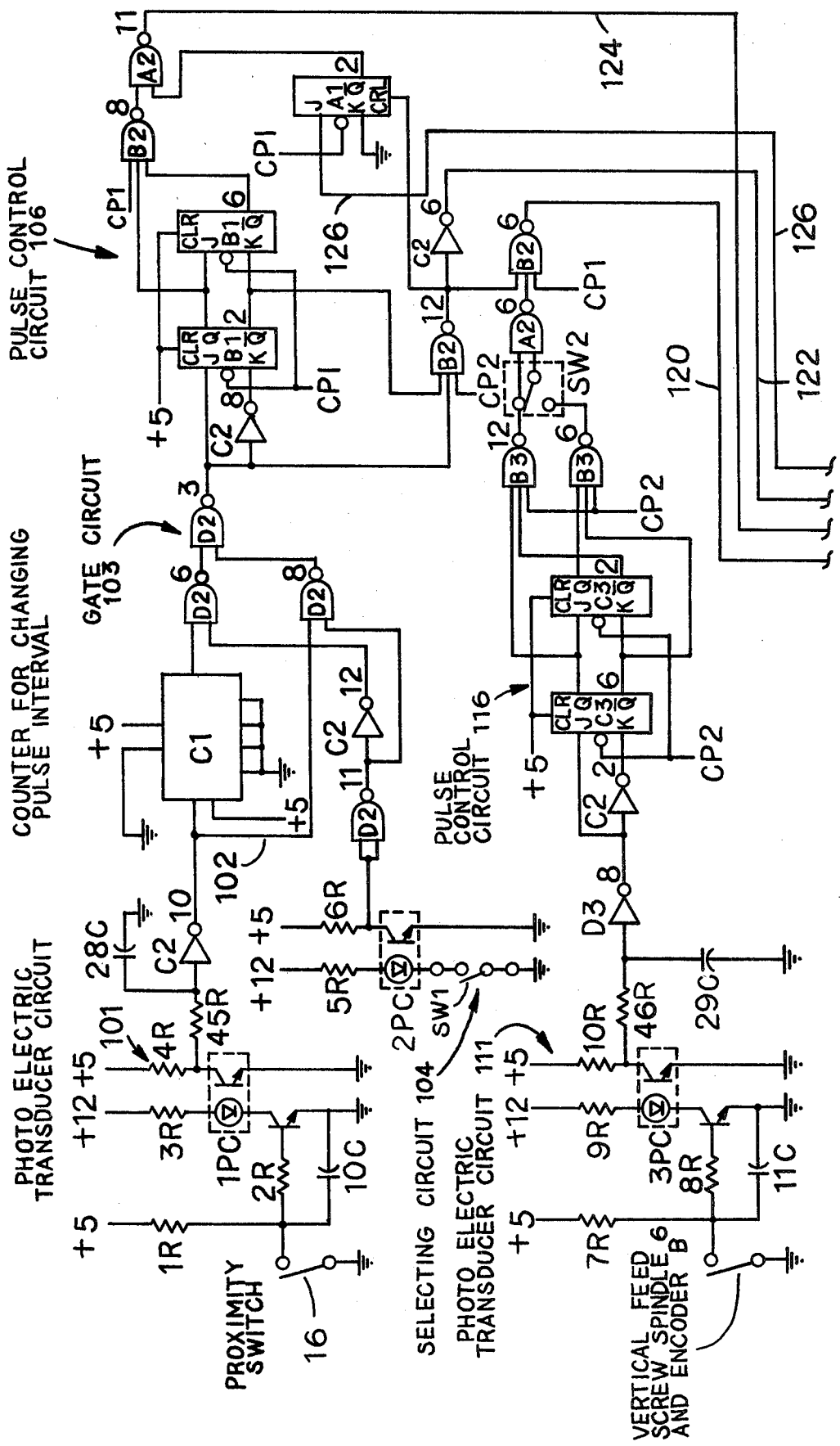
FIGS. 6a, b, c are a circuit diagram of a control for the FIG. 4 system and comprising subfigures.
Figure 6B:
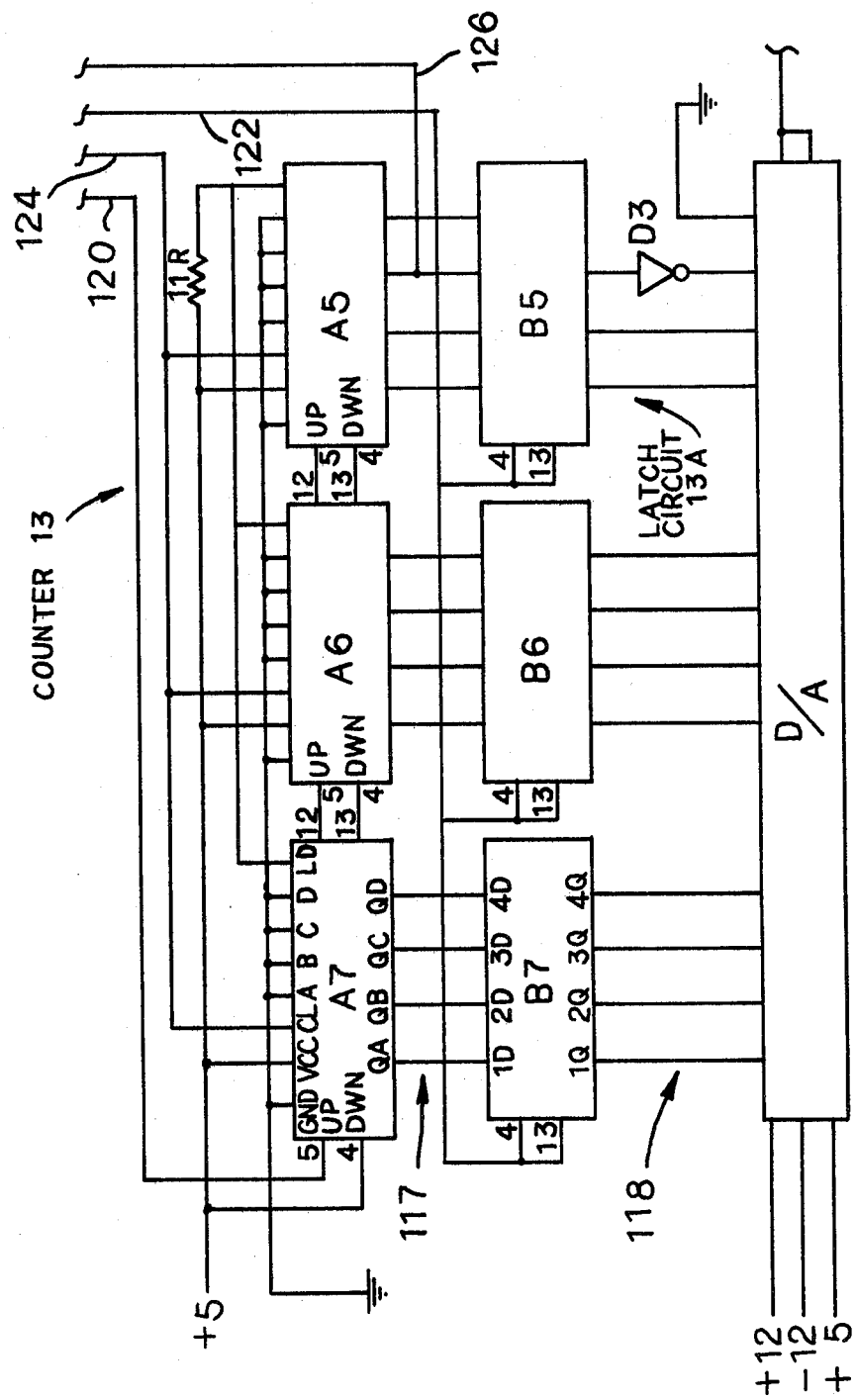
Figure 6C:
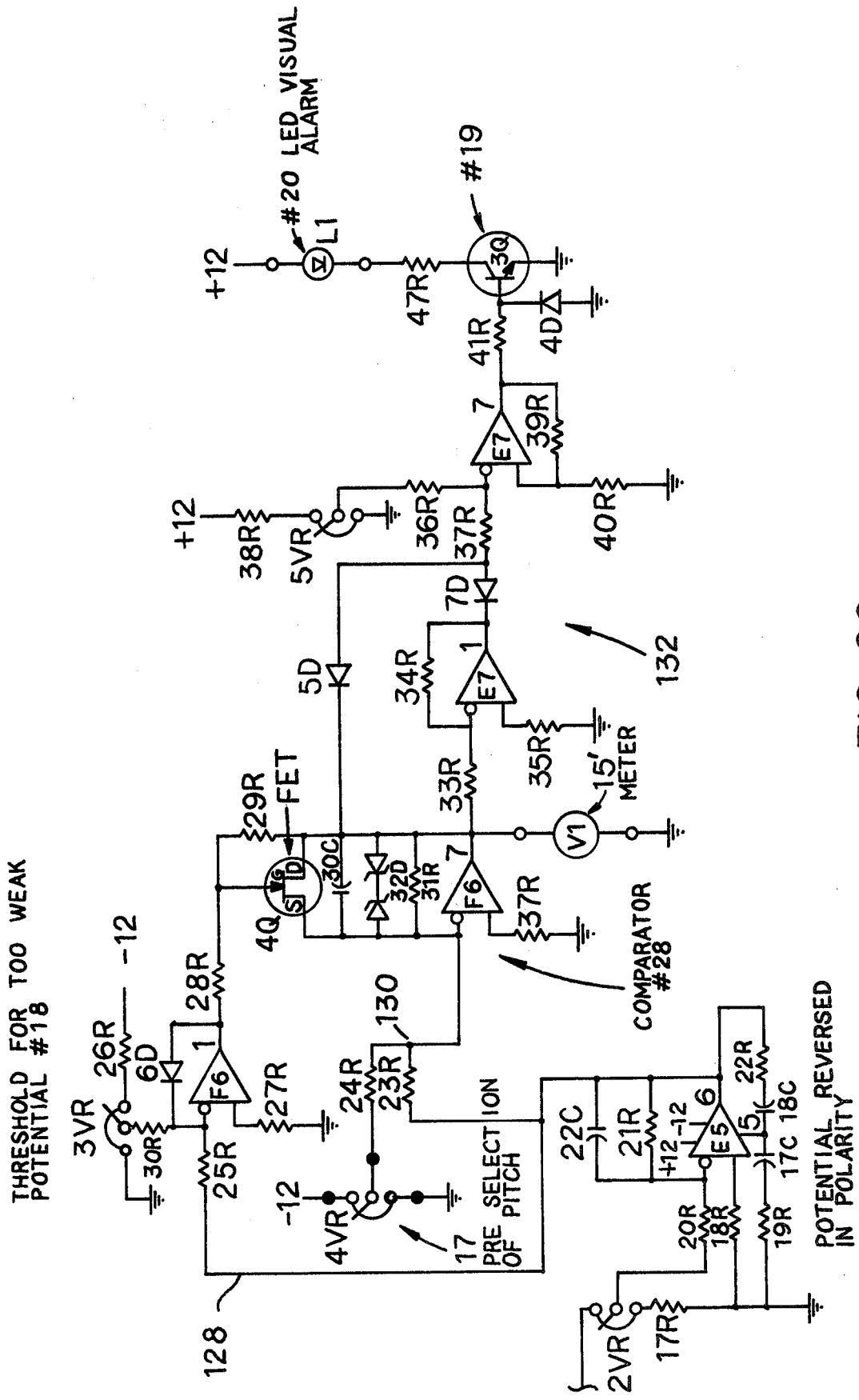

FIG. 6 is a preferred example of a circuit providing the above-discussed features of the FIG. 5 system along with additional detailed circuit features which may, if desired, be employed. In the particular example shown in FIG. 6, the pulse output of the proximity switch 16, normally one pulse per rotation of tool 3, is applied through a conventional photoelectric transducer circuit 101 to a series inverting amplifier C2-10. The photoelectric transducer circuit 101 is provided for purposes of noise isolation and comprises resistors 1R, 2R, 3R and 4R, capacitor 10C and LED-optical transistor unit 1PC, connected as shown to terminals of a conventional DC power supply (not shown). The DC power supply terminals, used throughout FIG. 6, are designated by a ground symbol and +5 and +12 symbols. It will be understood that these symbols are arbitrary and that the circuit can be adapted to use any desired or convenient voltage polarity and magnitude.

The input circuit for inverting amplifier C2-10 comprises a series resistor 45R and grounded capacitor 28C. In the following description of FIG. 6, certain active components are for convenience designated by a reference suffixed by an output pin number of that circuit element.

A circuit 104 is actuable to control a gate circuit 103 to select between two alternative paths by which pulses, generated by proximity switch 16 and appearing at the output of amplifier C2-10 may be applied to a pulse control circuit 106. One said path is through a counter C1 which outputs to gate circuit 103 one pulse for each 10 (for example) pulses generated by proximity switch 16, for effectively extending the pulse interval of the tool rotation pulse train from proximity switch 16. The other said path is directly through a conductor 102, which outputs to gate 103 one pulse for each single pulse generated by the proximity switch 16.

The gate circuit 103 comprises NAND gates D2-6, D-2-8 and D2-3 connected as shown to receive the pulse outputs of counter C1 and conductor 102 and a control input from selection circuit 104. The selection circuit 104 comprises a switch SW1 actuable to control, through an optical transducer 2PC biased conventionally by resistors 5R and 6R, a NAND gate B2-11 and an inverter C2-12, which in turn alternatively enable gates D2-8 and D2-6, respectively. Thus, selection of the two paths is made by switch SW1. When switch SW1 is turned off, the gate circuit 103 transmits the pulses from direct conductor 102 to circuit 106 at the switching rate of proximity switch 16. When the switch SW1 is turned on, the gate circuit 103 transmits pulses at the reduced rate from the counter C1 to circuit 106. The switch SW1 is thus actuable to permit the pulse rates out of gate circuit 103 to stay in the same limited range whether the machine is used for drilling (relatively fast tool rotation) or tapping (relatively slow tool rotation).

The FIG. 6 circuit includes a clock pulse source (not shown) for producing a train of clock pulses on mutually isolated clock pulse terminals CP1 and CP2, at a frequency substantially higher than the frequency of pulses from proximity switch 16 or encoder B', for example a frequency of 60,000 Hz/second.

The pulse control, or rectifying, circuit 106 comprises JK flip-flops B1-2 and B1-6 connected output to input in series as shown, with the J and K inputs of flip-flop B1-2 connected to the output of gate circuit 103, directly and through an inverter C2-8, respectively. Further, a NAND gate B2-8 provides a unique output in response to simultaneous positive (logic 1) inputs from clock pulse source CP1, the Q output line of flip-flop B1-2 and the $\overline{Q}$ output of flip-flop B1-6, to thus provide the pulse train output of circuit 106.

In the embodiment shown, the encoder B' generates pulses at the rate of 100 pulses per 1 mm of vertical feed of the support block 4, though different pulse rates may be used if desired.

The thus generated feed pulses are applied through a photo-electric transducer circuit 111, inverting amplifier D3-8 and a pulse control circuit 116, which are preferably identical to the above-described circuit 101, amplifier C2-10 and circuit 106, respectively. Pulse control circuit 116 thus includes JK flip-flops C3-6 and C3-2, an inverter C2-2 and an output NAND gate B3-12. The output of pulse control circuit 116 will normally be taken at the output of output NAND gate B3-12.

In addition, however, a switch SW2 is provided for selecting an alternate output path from circuit 116, taken from an alternate output gate B3-6 (connected as shown) to accommodate an encoder B' of different type. In the embodiment shown, for example, when the switch SW2 is connected to gate B3-6, two pulses are generated by each feed pulse from encoder B'. Thus, when encoder B' is the type generating only 50 pulses per each 1 mm of vertical feed of the supporting block, the feed pulse rate is increased to 100 pulses per 1 mm by switching to the alternate output gate B3-6.

The counter 13 here comprises serially connected counter blocks A5, A6 and A7 having parallel outputs connected by lines generally indicated at 117 to parallel inputs of the associated latch circuit 13A, which in turn has parallel outputs connected by lines generally indicated at 118 to parallel inputs of the digital to analog converter D/A.

During the time between the onset of successive rotation related pulses applied to pulse control circuit 106, vertical feed pulses from encoder B', transducer circuit 111, amplifier D3-8, and control circuit 116 are applied through switch SW2 and NAND gates A2-6 and B2-6 to an upcount line 120 leading to the series upcount terminal A7-5 of the counter A5-A7, such that the count in the counter advances incrementally for each pulse from the feed encoder B'.

After a period of time, during which the counter 13 continues counting pulses from the vertical feed encoder B', counter C1 (or alternatively the conductor 102) applies a pulse through gate circuit 103 to the J input of flip-flop B1-2 of control circuit 106 and to a NAND gate B2-12. Prior to the appearance of the next clock pulse on terminal CP1, NAND gate B2-12 changes state and provides an output. This output disables gate B2-6 to stop application of vertical feed encoder pulses to counter 13 so as to stop upcounting. This output also applies through an inverter C2-6 a latch command pulse through a latch command line 122 to cause the count in counter 13 to be stored in latch 13A. The same output from gate B2-12 also causes a flip-flop A1-2 to enable a NAND gate A2-11.

As above mentioned, the changed interval pulse from gate circuit 103 is also applied to the J input of flip-flop B1-2. Upon occurrence of the next clock pulse CP1, the state of flip-flop B1-2 changes. This disables above-discussed gate B2-12 and switches the output of gate B2-8 of control circuit 106.

Gate B2-8 and flip-flop A1-2 together then switch a NAND gate A2-11 which applies a signal through a clear counter line 124 to the clear inputs CL of the units A5-A7 of counter 13, clearing the counter to zero so as to be ready for another round of counting of vertical feed pulses from encoder B'. Clearing of the counter 13 changes the state of a feedback line 126 which connects to the J input of flip-flop A1-2 such that the next clock pulse appearing at terminal CP1 changes the state of flip-flop A1-2 and causes gate A2-11 to terminate the clear counter signal on line 124. This enables the counter 13 to resume counting of vertical feed pulses from the encoder B', applied thereto through line 120.

The pulse control circuits 106 and 116 will thus be seen to synchronize the outputs at gates B2-8 and B3-12 thereof with the interval between successive clock pulses on clock pulse lines CP1 and CP2.

Thus, counting of the pulses in the counter 13 begins after the existing previous count is cancelled by the signal delivered from tool rotation sensing proximity switch 16 and counter C1. Therefore, the pulses generated by the vertical feed encoder B' are continuously counted until the tool spindle rotation sensing proximity switch 16 causes the counter C1 (or the line 102) to cancel the existing count. Thus, the vertical feed motion is converted to a digital number which corresponds to one interval of the tool spindle rotation pulse train. This count is delivered to the latch device B5-7 and held there until the next tool rotation (proximity switch) signal is delivered to latch control inputs 11, 13.

The D/A converter converts the periodically changed digital output of the latch 13A to an analog voltage.

A fraction of this analog voltage is preselected by manual setting of a potentiometer 2VR in the input of the circuit of an amplifier E5-6, which amplifier circuit includes resistors 17R-22R and capacitors 17C, 18C and 22C and amplifier E5-6 connected as shown. The amplifier E5-6 reverses the polarity of the analog signal applied thereto and also provides stable gain in reproducing the analog signal at potentiometer 2VR despite possible unstable operation due to hereafter discussed resistors 23R and 24R. The analog voltage output of the amplifier E5-6 is applied through a line 128 first through a resistor 23R to a summing junction 130 and in parallel thereto through a resistor 25R to the inverting input of an operational amplifier F6-1 in aforementioned circuit 18. Aforementioned potentiometer 17 is used to preselect the desired feed rate, and has its wiper connected through a resistor 24R to summing junction 130 which in turn connects to the inverting input of operational amplifier F6-7. The actual feed rate voltage on line 128 and the desired feed rate voltage on the wiper of potentiometer 17 are of opposite polarity such that the voltage at summing junction 130 will swing up or down as the actual feed rate voltage on line 128 swings in magnitude above or below the desired feed rate of voltage appearing on the wiper of potentiometer 17. The output of amplifier F6-7 of the comparator circuit 28 is zero when the opposing actual and desired feed rate voltages applied to summing junction 130 are equal in magnitude and thus cancel each other. The output of amplifier F6-7 is applied to the meter 15', as above discussed, as well as to circuitry 132 for driving the LED visual alarm 20.

The comparator 28, in addition to mentioned summing resistors 23R and 24R and amplifier F6-7, further includes bias and feedback circuitry including resistors 31R and 32R dual zener diode 3Zd and capacitor 30C connected as shown.

The alarm drive circuitry 132 includes a first amplifier E7-1, with associated diodes 5D and 7D and resistors 33R-35R, connected as shown, driving further amplifier E7-7, with associated level setting and bias elements including potentiometer 5VR, resistors 36R-40R connected as shown and in turn driving further amplifier 19 comprised of power transistor 3Q and associated resistors 41R and 42R, as well as diode 4D. The LED visual alarm 20 comprises an LED L1 connected in the collector supply path of transistor 3Q.

The visual alarm 20 is actuable when the actual feed rate differs from (is above or below) the desired feed rate as set on potentiometer 17 by a difference exceeding the normal range of meter 15'. More particularly, resistors 36R and 37R are summing resistors with the input to amplifier E7-7 acting as a summing junction receiving opposite polarity potentials from the output of threshold potentiometer 5VR on the one hand and, on the other hand, either diode 7D or diode 5D (depending on whether the actual feed rate falls outside the range of meter 15' by reason of being too low or too high respectively). A typical threshold value set by potentiometer 5VR may be about 3.5 V. When the difference between the actual feed rate and desired feed rate is of magnitude exceeding the magnitude threshold set by potentiometer 5VR, the output of amplifier E7-7 switches high and actuates the transistor 3Q and hence turns on the LED visual alarm 20. Thus, the LED 20 ignites when the actual and desired feed rates differ by a magnitude exceeding the range of the meter 15'.

The voltage control circuit 18 includes the mentioned amplifier F6-1 as well as resistors 25R-28R and 30R, diode 6D and potentiometer 3VR. The actual feed rate voltage appearing at resistor 25R and the threshold voltage appearing at summing resistor 30R are of opposite polarity and are compared at the input of amplifier F6-1. A typical threshold value set by potentiometer 5VR may be about 73 mv. Threshold potentiometer 3VR preferably is set so that when the voltage at resistor 25R is so low as to be below the lowest possible level which would be supplied from the converter D/A during machining of a workpiece, the output of the amplifier F6-1 acts through resistor 28R to trigger an FET4Q connected across the input and output of aforementioned comparator amplifier F6-7, thus turning on the normally nonconductive FET and thereby rendering inoperative the comparator 28 and arbitrarily zeroing the meter. The FET circuit includes bias resistor 29R connected as shown.

The embodiments of the invention in which an exclusive property or privilege is claimed are defined as follows:

1. A feed rate sensing system for a drilling machine or the like and which is equipped for comparison of two potential values, one of which values represents the real value of the feed rate and the other of which values represents the desired value of the feed rate, the drilling machine having a linearly movable cutting tool supporting block carrying a rotatable tool spindle by which it drives taps, drills, and other kinds of cutting tools and makes said tools advance and retract with respect to a workpiece, the linear motion of said supporting block being converted to rotation of a screw by a ball screw appliance, the system comprising:

a pulse generating encoder driven by said screw and spindle for generating feed pulses;

proximity switch means including a segment on said tool spindle and a proximity switch fixed on said tool spindle support and actuated by said actuating segment on the tool spindle for generating a rotation pulse every time the proximity switch is actuated by rotation of said actuating segment past the switch at every turn of the spindle;

counting means receiving said feed pulses and rotation pulses for producing a digital output representing the real feed rate of the tool supporting block per revolution of the tool spindle;

a digital/analog converter for converting said digital output to an electrical potential value;

an electronic device having one input to which said converted potential value is applied;

a circuit including a potentiometer for converting the desired feed rate of the cutting tool per revolution to an electric potential value which is applied to the other input of said electronic device such that the output of said electronic device represents the difference between the desired and real feed rate values; and a synchronism meter for displaying the output of said electronic device.

2. The system of claim 1, in which said counting means comprises a counter for counting rotation pulses and a latch driven in parallel from said counter for storing the count therein, said latch being connected to said digital/analog converter for applying said stored count to parallel inputs of said digital/analog converter.

3. The apparatus of claim 2, including a further counter interposed between said proximity switch and first-mentioned counter for dividing the number of rotation pulses applied to said first-mentioned counter.

4. The apparatus of claim 1, in which said electronic device is a summing amplifier driven at a summing junction to which said one and other inputs of said electronic device connect, said converted potential value representing real feed rate and said potential value representing desired feed rate being applied as opposite polarity potentials to said summing junction, said meter being biased to swing in opposite directions from center as said summing junction swings positive or negative in response to predominance of one or the other of said feed rate voltages over the other.

5. The apparatus of claim 1, including means responsive to said encoder and proximity switch for displaying vertical feed rate and rate of rotation of the tool.

6. The apparatus of claim 1, in which said electronic device functions as a comparator having an output driving said meter, and including means responsive to the said converted potential value corresponding to a support block feed rate less than the lowest available feed rate in machining operations, for disabling said comparator and meter.

7. The apparatus of claim 6, in which said last-mentioned means comprise a further comparator controlled at a summing junction to which are applied said converted potential value representing actual feed rate and a preselected threshold potential, said further comparator driving an FET connected across said electronic device and conductive to disable the latter.

8. The apparatus of claim 1, including alarm means, means setting a threshold level corresponding substantially to the voltage level required for deflection of the meter to either end of its range and comparator means connected to said electronic device and responsive to both positive and negative voltage levels applied thereby to said meter to actuate said alarm device when such voltage levels applied to said meter exceed said threshold.

9. A feed rate sensing system for a drilling machine or the like and which is equipped for a comparison of two values, one of which represents the real feed rate of the tool and the other of which represents the desired feed rate of the tool, the machine having a tool supporting block advanceable at the feed rate and carrying a tool spindle rotatable at a rotation rate, comprising:

pulse generating means responsive to advancement of said tool support block for generating feed pulses;

means responsive to rotation of said tool spindle for generating rotation pulses in proportion to the rotation rate of said tool;

counting means receiving said feed pulses and rotation pulses for producing a digital output representing the real feed rate of the tool supporting block per revolution of the tool spindle;

means for converting said digital output to an analog value representing real feed rate per unit revolution of said tool spindle;

means settable to a value corresponding to a desired feed rate;

means for comparing said real and desired feed rate values; and display means for displaying the output of said comparing means.

* * * * *